Dec. 22, 1970 JAMES E. WEBB 3,548,633
ADMINISTRATOR OF THE NATIONAL AERONAUTICS
AND SPACE ADMINISTRATION
METHOD OF EVALUATING MOISTURE BARRIER PROPERTIES OF
ENCAPSULATING MATERIALS
Filed March 11, 1968

INVENTOR.
WILLIAM BERT ELLERN

United States Patent Office 3,548,633
Patented Dec. 22, 1970

3,548,633

METHOD OF EVALUATING MOISTURE BARRIER PROPERTIES OF ENCAPSULATING MATERIALS

James E. Webb, Administrator of the National Aeronautics and Space Administration, with respect to an invention of William Bert Ellern, Los Angeles, Calif.

Filed Mar. 11, 1968, Ser. No. 711,898
Int. Cl. G01n *15/08*
U.S. Cl. 73—38 7 Claims

ABSTRACT OF THE DISCLOSURE

A procedure for evaluating the moisture barrier properties of encapsulating materials such as conformal coatings and embedment resins is disclosed. A humidity sensitive element such as a dry carbon composition resistor is encapsulated with the candidate material. The assembly is subjected to a humid environment, and the change in resistance representing an indication of the penetration of moisture through the encapsulating material is determined. The pressure of the encapsulating material and the temperature effects of the environment can also be determined.

ORIGIN OF THE INVENTION

The invention described herein was made in the performance of work under a NASA contract and is subject to the provisions of Section 305 of the National Aeronautics and Space Act of 1958, Public Law 85–568 (72 Stat. 435; 42 USC 2457).

BACKGROUND OF THE INVENTION

(1) Field of the invention

The present invention relates to a method of evaluating the materials used in encapsulation of electronics and more particularly to the evaluation of moisture barrier properties of conformal coatings.

(2) Description of the prior art

There is a need for a procedure for determining the moisture barrier properties of materials utilized for encapsulating electronic components either by embedment or by conformal coating or by other methods. Many circuits are used which are sensitive to changes in the value of their own components, or to stray leakage. The conductivity characteristics of electronic components such as resistors are found to change with humidity. Circuits change characteristics according to the amount of moisture in the air, with the air providing a leakage path. To isolate these components, or circuits from their environment, they are encapsulated by conformal coating or embedment. Even with encapsulation of the component, or circuit, any permeability of the encapsulating material to moisture will result in a change in the absolute calibrated value of the circuit. The effects of moisture may be further complicated by the effects of pressure exerted by the encapsulating material. Spacecrafe subsystems were exposed to heat which caused sufficient force on the embedded equipment to cause component breakage. A means of evaluating the pressure exerted by the encapsulating material is also required.

Many conformal coatings and embedment materials have been rated as humidity resisting by the manufacturers. These materials are currently evaluated on the basis of the chemical classification of the resin utilized.

Measurement of vapor permeability generally cannot be done since it involves relatively large and cumbersome instruments.

OBJECTS AND SUMMARY OF THE INVENTION

It is therefore an object of the invention to provide a simpler technique for measuring the vapor permissivity of materials.

Yet another object of the invention is to provide a non-destructive test for measuring the moisture barrier characteristics of materials utilized for embedment or as conformal coatings.

A still further object of the invention is to devise a procedure for permitting the sterilization of components embedded in plastic materials without affecting the component or the material.

Yet another object of the invention is the provision of an evaluation procedure for accepting or rejecting encapsulation materials for electronics.

These and other objects of the invention will become apparent as the description proceeds.

According to the invention, a hygroscopic resistor element responding to increased moisture absorption, such as a carbon composition resistor, is conditioned to remove internal moisture and is encapsulated by being coated with a candidate conformal coating material or by being embedded in a candidate embedment material, and is then subjected to a humid environment. Increase in the resistance is attributable to penetration of moisture, which may be proven by reconditioning the resistors by heating to drive off the penetrated moisture. Quantitative data can be obtained by comparing the change in value of the resistor which is encapsulated with the resistance change suffered by a set of unencapsulated, control resistors having been subjected to the same environment. Thus, the protection provided by the encapsulation material against the environment can be evaluated. Qualitatively, encapsulated resistors exhibiting a resistance response to humidity approaching that of unencapsulated resistors can easily be rejected and sorted since the encapsulation provides virtually no protection against moisture.

The invention will now become better understood by reference to the following detailed description when considered in conjunction with the accompanying examples and drawings. It is to be understood that the examples and drawings are offered by way of illustration only and that many substitutions, modifications, and alterations are permissible.

DESCRIPTION OF THE PREFERRED EMBODIMENTS

Figure 1:
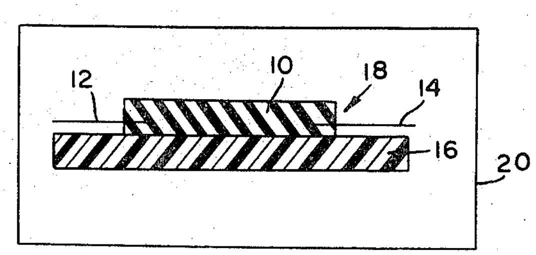
FIG. 1 is a schematic view illustrating dry conditioning of an assembly of a resistance sensitive hygroscopic element mounted on a printed circuit board.

Carbon resistors are very desirable elements for use in the evaluation technique of the invention since there are many inexpensive, readily available, humidity responsive resistors in ranges from $\frac{1}{10}$ to 2 watts, and 1 to 1,000,000 ohms, which can be of the glass-carbon film or the carbon composition type. The latter types are preferred since the humidity response of the carbon particles is enhanced by suspension in a suitable plastic binder. Referring now to FIG. 1, the carbon-binder composition is usually pressure molded into a preformed cylindrical body 10 around two leads 12, 14 in the ends thereof, and then the body is fired to drive off solvent and to cure and fix the composition onto the leads.

Carbon composition resistors are sensitive to heat, pressure, and moisture, but they respond to each condition in a different manner. A newly manufactured resistor has an inherent value of resistance. The value of the resistor at any given instant, however, depends on the environmental conditions to which the resistor has been exposed. Resistance increases due to moisture or humidity are temporary and reversible. Resistance changes due to pressure are also temporary, provided there has been no distortion at the juncture of the resistor lead and the resistor body. Carbon composition resistors exposed to pressure exhibit a decreased resistance with increases in pressure and return to the initial value of resistance when the pressure is released. Resistance changes due to heat are also temporary provided the heat is not excessive. Carbon composition resistors exposed to heat exhibit a decreased resistance with increases in temperature and return to the initial value of resistance when the resistor is returned to the initial temperature. Resistors exposed to excessive heat change resistance permanently, a condition known as aging. This aging change is generally to a lower value of resistance. It is noted that only the presence of moisture or humidity tends to cause an increase in resistance.

Therefore, in order to have an accurate evaluation procedure in which the change in resistance is solely due to the moisture barrier properties of the encapsulating material, it is necessary to isolate the temperature and pressure effects. The carbon composition resistor should also be initially conditioned prior to encapsulation to remove moisture, and should be protected from the environment when not being used for measurement by being sealed in a dry, inert atmosphere. A typical inert atmosphere is nitrogen gas.

Another humidity sensitive element responsive to increased humidity by a change in resistance is the printed circuit board used to support and/or connect the electronic circuits. The humidity sensitive leakage of the printed circuit board may be enhanced with a grid pattern such as two combs of conductive material deposited in close proximity onto base material such as ceramic or diallyl phthalate plasticized polyester resin. Ceramic base printed circuits have the advantage over carbon composition resistors in that the latter are limited to tests in which the resin used to encapsulate has a cure temperature below the decomposition temperature of the carbon resistor.

Figure 2:
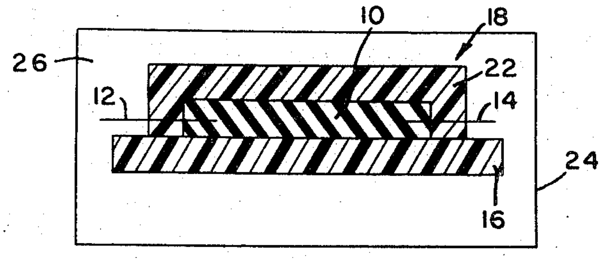
FIG. 2 is a schematic view of the encapsulated assembly of FIG. 1 being subjected to a humid environment.
Figure 3:
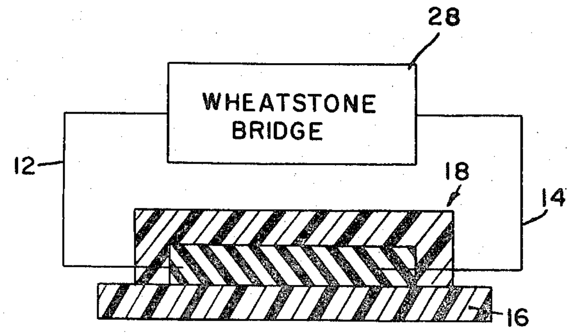
FIG. 3 is a schematic view of a measuring system, according to the invention.

According to the evaluation procedure, a carbon composition resistor in the form of a cyclindrical body 10 is first mounted on a printed circuit board 16 to form an assembly 18, or assembled as a welded assembly, or otherwise put into the physical configuration desired. The carbon composition resistor is then rendered bone dry by heating the assembly 18 in a dry atmosphere oven 20 at 100° C. for at least 24 hours. The inherent resistance value of the dry resistor is then measured. Referring now to FIG. 2 the assembly 18 is then encapsulated by being coated with the candidate conformal coating resin 22, or embedded in an embedment resin, or by other means, and the resin is cured in a controlled atmosphere oven. Typically, the conformal coatings are brushed onto the board, or the board is dipped into the resin, with resulting thicknesses of 0.05 to 0.125 inch, while the embedment material is formed around the assembly by potting with resulting thicknesses of at least ¼ inch. The resistance of the carbon composition resistor is measured again. This measurement can be used to indicate the amount of bulk pressure exerted on the carbon composition resistor by the encapsulating material. The encapsulated assembly 18 is then placed in a container 24 including an environment 26 of controlled humidity and is subjected to the humid environment for a suitable time and the resistance of the resistor 10 is again measured. The difference between this measurement and the one taken before the humidity cycle indicates the degree of protection provided by the encapsulating material to moisture. Referring now to FIG. 3, the external circuit used to make the resistance measurements can be a Wheatstone bridge 28 or a Kelvin bridge connected to leads 12, 14.

Currently, the most widely used method of determining the pressure exerted by a conformal coating or an embedment resin is to allow a portion of the material to solidify around the bulb of a thermometer. The pressure squeezes the thermometer bulb causing an indicated temperature above ambient which is directly proportional to the pressure. The pressure/temperature ratio is determined by previously sealing the thermometer into a pressure cap and calibrating it on a dead weight hydraulic pressure tester. The thermometer and pressure cap are then connected to a mold and the mold filled with the candidate embedding material. After the resin is cured, the pressure can be determined from the indicated temperature. This method is difficult to apply in that thermometers are very fragile and can be broken by rough handling, by the material used to seal the thermometer into the pressure cap, by too rapid temperature changes during the resin curing cycle, by improper adhesion of the embedment material to the pressure cap, and in that the mercury column in the thermometer can separate. Because a specific mold is used in this method, the results may bear little relation to the pressure exerted when the candidate material is actually used in a different configuration on an electronic circuit.

It is possible to determine the internal compression caused by encapsulation materials in terms of changed resistance by treating a carbon composition resistor as a pressure sensitive transducer. The resistance of a carbon composition resistor changes in an extremely linear fashion with bulk pressure. This relationship between resistance and pressure can be closely approximated by the equation $R=-AP+r$ for a wide range of pressure, where R is the resistance under pressure, A is the resistance/pressure ratio, P is the pressure, and $r$ is the initial value of resistance of the resistor used. This effect is not dependent upon the moisture content of the resistor. Thus, measurement of the pressure of the encapsulating material can be made either independently of measurement of the moisture barrier properties, or measurement of the pressure can be made during the same test procedure.

According to the evaluation procedure, a carbon composition resistor is first mounted to the wire leads of a pressure cap and calibrated on a dead weight hydraulic pressure tester. The carbon composition resistor is capable of sustaining pressures up to 10,000 p.s.i.g. without permanent change. Higher pressures may cause the hydraulic fluid to be forced through the preformed insulating shell causing possible permanent change. Several measurements should be made over the pressure range it is desired to measure to prove the integrity of the resistor body, and to assure that no internal voids exist. These defects occur in a small number of resistors and cause an erratic change in the linear relationship of resistance and pressure. Any two points are sufficient to establish the value of A, the resistance/pressure ratio. Preferable points are, however, at the ends of the anticipated ranges of pressures. The carbon composition resistor is then removed from the leads of the pressure cap, cleaned, and mounted in the physical configuration desired. Precautions must be taken at this point with regard to the absorption of moisture. The heat occurring in the curing process of most resins drys out the carbon composition resistor leading to erroneous pressure readings. The carbon composition resistor must be dried out prior to encapsulation. This is done by heating the assembly in a dry atmosphere oven at least 24 hours at 100° C. The inherent resistance value of the dry resistor is then measured. The assembly is then encapsulated by being coated with the candidate conformal coating resin, or embedded in an embedment resin, or by other means, and the resin is cured. The resistance is measured again. The bulk pressure is derived from substitution of the values measured in the equation given.

The following examples illustrate the utilization of the method of the invention to determine the moisture barrier properties, and the bulk pressure after curing of an urethane and two epoxy resins.

The following carbon composition resistors were used in these experiments:

Type CB1055, 1 megohm, 5%, ¼ watt, manufactured by Allen Bradley Co., designated R4; Type CB1035, 10,000 ohms, 5%, ¼ watt, manufactured by Allen Bradley Co., designated R5; Type CB1045, 100,000 ohms, 5%, ¼ watt, manufactured by Allen Bradley Co., designated R6; and Type GBT–½W, 100,000 ohms, 5%, ½ watt, manufactured by International Resistor Company, designated R8.

Before fabrication of the test assemblies, a group of each of the components were measured and then subjected to three heat cycles of 145° C. Those components which showed physical damage, or went out of the tolerance limits were rejected. The purpose of this test was to build confidence that after fabrication of the components into assemblies, the components would survive the tests planned for them.

The components were next calibrated over a pressure range of 0 to 10,000 p.s.i.g., as described earlier. A graph of pressure vs. resistance was made for each resistor. Those components showing broken line graphs were rejected as probably having some internal defect.

The remaining resistors were used in the fabrication of printed wiring boards and welded module assemblies. The printed wiring boards contained the resistor components mounted between pairs of bifurcated terminals. They were soldered into place according to JPL Process Specification No. ZPE–1081–0002–A entitled "Soldering of Electronic Equipment." The lead material in each case was solder coated copper. The welded modules contained the resistor components welded to interconnecting ribbon and connector leads of alloy 90. The components were welded into modules according to JPL Process Specification No. VMO–50408–PRS entitled "Resistance Welding of Electrical Connections."

From the fabricated assemblies, units were used to test the validity of the method of determining internal pressure. Electrical measurements were made on four printed wiring boards and seven welded module assemblies. The assemblies were cleaned with 1,1,1-trichloroethane. Two printed wiring boards were conformally coated with Solithane 113/catalyst 300 (Thiokol Chemical) and the resin cured. Three welded modules were embedded in Stycast 1090/catalyst 11 (Emerson and Cuming) and the resin cured. Two modules were embedded in Epon 828/catalyst Z (Shell Chemical) and the resin cured. Two uncoated printed wiring boards and two unembedded welded modules were processed through the curing processes as control units.

After curing, electrical measurements were made on the resistor components. The assemblies were then placed in a sterilization chamber and exposed to a mixture of 12% by weight ethylene oxide (ETO) in Freon-12, and water vapor at a pressure of 7 p.s.i.g. for 28 hours. The relative humidity of the chamber was 50±10% and the temperature was 50°±3° C. The assemblies were removed from the ETO chamber and exposed to 135° C. heat in a dry nitrogen environment for 92 hours. After this the assemblies were electrically measured.

Comparison of the data obtained before embedment, after embedment, and after sterilization with the data from the conformal coated and control assemblies revealed large changes in resistance which could not be accounted for by pressure alone. It was established that these changes were caused by the absorption of moisture by the resistors before encapsulation. All of the assemblies had been subjected to heat during curing which changed their moisture content and produced additional change in resistance. By correlation of the data, it was possible to determine that the pressure generated by Epon 828/catalyst Z was approximately twice that produced by Stycast 1090/catalyst 11. There was no significant difference in the data of the printed wiring boards conformal coated with Solithane 133/catalyst 300 and the control assemblies.

This established the need for the removal of moisture from the carbon composition resistors prior to their encapsulation.

The remaining ten printed wiring boards and ten welded module assemblies were used to determine the pressures generated by the encapsulating materials, and to determine the moisture barrier properties of these materials.

The assemblies were cleaned with 1,1,1-trichloroethane. The assemblies were baked for 48 hours at 212° F. in a dry nitrogen atmosphere to remove any moisture from the carbon composition resistors. They were stored in plastic bags which had been blown out with dry nitrogen until they were electrically measured, and encapsulated. Six printed wiring boards were coated with Solithane 113/catalyst 300 and the resin cured. Six welded modules were embedded in Stycast 1090/catalyst 11 and the resin cured. Four printed wiring boards and four welded modules were processed through the curing processes as control units, but neither conformal coated nor embeded.

STERILIZATION ENVIRONMENT (a) ETO—The assemblies were placed in an ETO chamber and exposed to a mixture of 12% by weight ethylene oxide in Freon-12, and water vapor at a pressure of 7 p.s.i.g. for three cycles of 28 hours (84 hours total). The relative humidity of the chamber was 50±10% and the temperature was 50±3° C.

(b) Heat—The assemblies were placed in an oven and exposed to three cycles of heat. Each cycle is either 145° C. for 36 hours (108 hours total), or 135° C. for 92 hours (276 hours total).

A group of two printed wiring boards conformal coated with Solithane 113, two control printed wiring boards, two welded modules embedded in Stycast 1090 and two control welded modules were exposed to the ETO environment once, and the 145° C. heat environment twice. Electrical measurements of the carbon composition resistors were made after each exposure.

A group of four printed wiring boards conformal coated with Solithane 113, two control printed wiring boards, four welded modules embedded in Stycast 1090 and two control welded modules were exposed to the ETO environment twice, and the 135° C. heat environment twice. Electrical measurements of the carbon composition resistors were made after each exposure.

The resistance data collected from testing these specimens is displayed in the following Table 1.

The computed pressures are displayed in Table 2. The value of A, the resistance/pressure ratio, used in converting the data in Table 1 into that in Table 2 was:

.0002775 ohm/lb. for resistor R4
.0001975 ohm/lb. for resistor R5
.002305 ohm/lb. for resistor R6, and
.0005450 ohm/lb. for resistor R8.

TABLE 1.—SUMMARY OF CARBON COMPOSITION RESISTOR VALUES (ohms)

Welded modules embedded in Stycast 1090

Module No. 20

| Pressure calibrated resistors | R-4 | R-5 | R-6 | R-8 |
|---|---|---|---|---|
| After conditioning | 963,400 | 10,045 | 98,137 | 101,790 |
| After embedment | 946,300 | 9,911 | 97,066 | 101,530 |
| After 3 ETO cycles | 943,200 | 9,896 | 96,850 | 101,320 |
| After 3 145° C. heat cycles | 941,250 | 9,887 | 96,238 | 98,985 |
| After 6 145° C. heat cycles | 938,600 | 9,875 | 95,900 | 98,360 |

Module No. 21

| Pressure calibrated resistors | R-4 | R-5 | R-6 | R-8 |
|---|---|---|---|---|
| After conditioning | 968,250 | 10,052 | 97,180 | 100,300 |
| After embedment | 947,130 | 9,927 | 95,452 | 100,110 |
| After 3 ETO cycles | 943,500 | 9,910 | 95,300 | 100,020 |
| After 3 145° C. heat cycles | 941,500 | 9,908 | 94,800 | 97,163 |
| After 6 145° C. heat cycles | 938,700 | 9,900 | 94,280 | 96,624 |

Printed wiring boards conformal coated with Solithane 113

Module No. 6

| Pressure calibrated resistors | R-4 | R-5 | R-6 | R-8 |
|---|---|---|---|---|
| After conditioning | 969,440 | 10,220 | 97,850 | 100,840 |
| After coating | 974,711 | 10,257 | 98,310 | 101,000 |
| After 3 ETO cycles | 1,014,000 | 10,521 | 101,340 | 101,160 |
| After 3 145° C. heat cycles | 969,000 | 10,205 | 97,340 | 97,710 |
| After 6 145° C. heat cycles | 967,200 | 10,191 | 97,070 | 96,950 |

Module No. 10

| Pressure calibrated resistors | R-4 | R-5 | R-6 | R-8 |
|---|---|---|---|---|
| After conditioning | 983,300 | 10,155 | 98,103 | 101,940 |
| After coating | 989,000 | 10,182 | 98,571 | 102,160 |
| After 3 ETO cycles | 1,030,900 | 10,442 | 101,690 | 102,330 |
| After 3 145° C. heat cycles | 981,000 | 10,135 | 97,620 | 98,630 |
| After 6 145° C. heat cycles | 979,600 | 10,124 | 97,420 | 98,060 |

Unembedded or uncoated control specimens

Module No. 18

| Pressure calibrated resistors | R-4 | R-5 | R-6 | R-8 |
|---|---|---|---|---|
| After conditioning | 965,120 | 10,066 | 98,063 | 99,972 |
| After embedment process | 968,920 | 10,060 | 98,043 | 100,310 |
| After 3 ETO cycles | 1,009,400 | 10,327 | 101,360 | 100,450 |
| After 3 145° C. heat cycles | 964,200 | 10,049 | 97,710 | 96,940 |
| After 6 145° C. heat cycles | 963,700 | 10,032 | 97,620 | 96,620 |

Module No. 19

| Pressure calibrated resistors | R-4 | R-5 | R-6 | R-8 |
|---|---|---|---|---|
| After conditioning | 967,400 | 10,089 | 98,059 | 99,700 |
| After embedment process | 972,000 | 10,094 | 98,000 | 100,280 |
| After 3 ETO cycles | 1,010,000 | 10,356 | 101,300 | 100,170 |
| After 3 145° C. heat cycles | 969,500 | 10,096 | 97,803 | 96,950 |
| After 6 145° C. heat cycles | 967,200 | 10,069 | 97,490 | 96,360 |

Unembedded or uncoated control specimens

Module No. 29

| Pressure calibrated resistors | R-4 | R-5 | R-6 | R-8 |
|---|---|---|---|---|
| After conditioning | 983,820 | 10,048 | 100,250 | 101,880 |
| After coating process | --- | --- | --- | --- |
| After 3 ETO cycles | 1,026,000 | 10,323 | 103,590 | 101,980 |
| After 3 145° C. heat cycles | 978,700 | 10,005 | 99,580 | 98,380 |
| After 6 145° C. heat cycles | 974,650 | 9,969 | 99,285 | 97,900 |

Module No. 30

| Pressure calibrated resistors | R-4 | R-5 | R-6 | R-8 |
|---|---|---|---|---|
| After conditioning | 984,720 | 10,193 | 97,844 | 100,920 |
| After coating process | --- | --- | --- | --- |
| After 3 ETO cycles | 1,028,100 | 10,471 | 101,080 | 101,090 |
| After 3 145° C. heat cycles | 980,000 | 10,157 | 97,040 | 97,380 |
| After 6 145° C. heat cycles | 978,700 | 10,133 | 96,880 | 96,810 |

TABLE 2.—SUMMARY OF ASSEMBLY AS COMPUTED FROM RESISTANCE CHANGE welded modules embedded in Stycast 1090

Module No. 20

| Pressure calibrated resistors | R-4 | R-5 | R-6 | R-8 |
|---|---|---|---|---|
| After embedment | 617 | 678 | 464 | 477 |
| After 3 ETO cycles | 729 | 754 | 557 | 862 |
| After 3 145° C. heat cycles | 799 | 780 | 822 | 5,142 |
| After 6 145° C. heat cycles | 894 | 861 | 969 | 6,283 |

Module No. 21

| Pressure calibrated resisters | R-4 | R-5 | R-6 | R-8 |
|---|---|---|---|---|
| After embedment | 762 | 637 | 748 | 348 |
| After 3 ETO cycles | 893 | 717 | 814 | 513 |
| After 3 145° C. heat cycles | 965 | 729 | 1,031 | 5,751 |
| After 6 145° C. heat cycles | 1,066 | 772 | 1,256 | 6,739 |

Printed wiring boards conformal coated with Solithane 113

Module No. 6

| Pressure calibrated resistors | R-4 | R-5 | R-6 | R-8 |
|---|---|---|---|---|
| After coating | (190) | (188) | (199) | (293) |
| After 3 ETO cycles | (1,608) | (1,527) | (1,511) | (587) |
| After 3 145° C. heat cycles | 16 | 76 | 220 | 5,738 |
| After 6 145° C. heat cycles | 81 | 147 | 338 | 7,132 |

Module No. 10

| Pressure calibrated resistors | R-4 | R-5 | R-6 | R-8 |
|---|---|---|---|---|
| After coating | (205) | (137) | (203) | (403) |
| After 3 ETO cycles | (1,681) | (1,456) | (1,553) | (715) |
| After 3 145° C. heat cycles | 83 | 101 | 209 | 6,068 |
| After 6 145° C. heat cycles | 134 | 157 | 296 | 7,113 |

Unembedded or uncoated control specimens

Module No. 18

| Pressure calibrated resistors | R-4 | R-5 | R-6 | R-8 |
|---|---|---|---|---|
| After embedment process | (137) | 30 | 9 | (620) |
| After 3 ETO cycles | (1,601) | (1,324) | (1,428) | (876) |
| After 3 145° C. heat cycles | 33 | 86 | 153 | 5,559 |
| After 6 145° C. heat cycles | 51 | 172 | 192 | 6,145 |

Module No. 19

| Pressure calibrated resistors | R-4 | R-5 | R-6 | R-8 |
|---|---|---|---|---|
| After embedment process | (165) | (25) | 25 | (1,063) |
| After 3 ETO cycles | (1,537) | (1,354) | (1,404) | (862) |
| After 3 145° C. heat cycles | (76) | (36) | 111 | 5,042 |
| After 6 145° C. heat cycles | 7 | 101 | 246 | 6,123 |

Module No. 29

| Pressure calibrated resistors | R-4 | R-5 | R-6 | R-8 |
|---|---|---|---|---|
| After coating process | --- | --- | --- | --- |
| After 3 ETO cycles | (1,522) | (1,395) | (1,425) | (183) |
| After 3 145° C. heat cycles | 185 | 218 | 290 | 6,417 |
| After 6 145° C. heat cycles | 330 | 4,041 | 418 | 7,297 |

Module No. 30

| Pressure calibrated resistors | R-4 | R-5 | R-6 | R-8 |
|---|---|---|---|---|
| After coating process | --- | --- | --- | --- |
| After 3 ETO cycles | (1,565) | (1,410) | (1,401) | (312) |
| After 3 145 C. heat cycles | 170 | 183 | 348 | 6,490 |
| After 6 145° C. heat cycles | 217 | 304 | 417 | 7,535 |

Numbers shown in parentheses are calculated negative pressures caused by absorption of moisture. Pressure units are used because of lack of another suitable set of units in this application.

Resistance measurements made with resistors which had been conditioned prior to encapsulation gave very consistent results. The quantitative measure of the pressure exerted by the embedment materials agree very well with each other, and with the data resulting from thermometer embedment experiments. The data also shows penetration of water into both the embedded and the conformal coated assemblies, when the assemblies are subjected to ETO sterilization, and the drying out of the assemblies when they are subjected to heat sterilization. This data indicates that Stycast 1090 presents a good seal against external humidity.

However, comparison of the resistance values of the assemblies which were conformal coated with Solithane 113 with the uncoated control assemblies show unexpectedly that this material provides little or no control against external humidity. It is noted that the resistances return to pre-ETO values when they are subjected to a heat environment, demonstrating that the change in resistance is reversible, and thus due to moisture penetrating the conformal coating.

Resistor R8 was shown to be unsuitable for use in the moisture measurement procedure of the invention since heat caused excessive reduction in resistance due to aging.

It is to be understood that the foregoing relates only to the preferred embodiments of the invention and that numerous substitutions, modifications and alterations are all permissible without departing from the scope of the invention.

What is claimed is:

1. A method of evaluating the moisture barrier properties of a resinous encapsulating material comprising the steps of:

drying to bone dryness a carbon composition hygroscopic element resistance responsive to changes in moisture content;

measuring the inherent resistance value of said dried element;

encapsulating said dried element within the encapsulating resin;

curing said resin;

exposing said encapsulated element to a humid environment; and measuring any decrease in resistance to determine the water vapor permeability of said encapsulating resin.

2. A method according to claim 1 in which said hygroscopic element comprises carbon suspended in a binder.

3. A method according to claim 1 in which said resin is heat curable organic resin.

4. A method according to claim 3 in which said resin is an epoxy or an urethane resin.

5. A method according to claim 1 in which said drying is conducted in a dry atmosphere oven at 100° C. for at least 24 hours.

6. A method of evaluating the moisture barrier and bulk pressure properties of curable encapsulating materials comprising the steps of:

drying to bone dryness a carbon composition hygroscopic element resistance responsive to changes in pressure and moisture content;

measuring the inherent resistance value of said dried element;

encapsulating said dried element within an encapsulating resin;

curing said resin;

measuring any increase in resistance to establish a second resistance value and determining the bulk pressure exerted by said cured resin from the difference between said second resistance value and said inherent resistance value;

exposing said encapsulated element to a humid environment; and measuring any decrease in resistance from said second value to determine the water vapor permeability of said resin.

7. A method according to claim 6 further including the step of pressure calibrating said element.

References Cited

UNITED STATES PATENTS

| | | | |
|---|---|---|---|
| 2,714,149 | 7/1955 | Craig et al. | 73—73X |

OTHER REFERENCES

Honeywell Apparatus Control Div., Sensor Products Catalog No. 52-5018. New Electronic "WVT" Water Vapor Transmission Rate Tester for Packaging Materials. April 1966.

LOUIS R. PRINCE, Primary Examiner

F. SHOON, Assistant Examiner

U.S. Cl. X.R.

73—159